United States Patent
Linnemann et al.

(10) Patent No.: US 7,430,792 B2
(45) Date of Patent: Oct. 7, 2008

(54) DEVICE FOR PROCESSING COMPONENTS FOR MEANS OF TRANSPORT, IN PARTICULAR FOR PROCESSING SECTIONS FOR AIRCRAFT

(75) Inventors: Henrik Linnemann, Hamburg (DE); Holger Frauen, Hamburg (DE); Tomas Gnauck, Neu Wulmstorf (DE); Eike Klemkow, Hamburg (DE); Wolfgang Ende, Neu Wulmstorf (DE); Frank Neuhaus, Jork (DE)

(73) Assignee: Airbus Deutschland GmbH (DE)

( * ) Notice: Subject to any disclaimer, the term of this patent is extended or adjusted under 35 U.S.C. 154(b) by 395 days.

(21) Appl. No.: 11/259,669

(22) Filed: Oct. 26, 2005

(65) Prior Publication Data
US 2006/0143890 A1 Jul. 6, 2006

(30) Foreign Application Priority Data
Oct. 26, 2004 (DE) .................... 10 2004 051 915

(51) Int. Cl.
B23P 21/00 (2006.01)
(52) U.S. Cl. .................. 29/33 K; 29/34 B; 29/407.1
(58) Field of Classification Search .............. 29/33 K, 29/34 B, 407.5, 243.5, 243.51, 464, 466, 29/468, 281.1, 281.5, 281.6, 524.1, 897.2
See application file for complete search history.

(56) References Cited
U.S. PATENT DOCUMENTS

| | | | |
|---|---|---|---|
| 4,613,262 A | | 9/1986 | Woods |
| 4,662,556 A | * | 5/1987 | Gidlund ........................ 29/34 B |
| 5,088,171 A | | 2/1992 | Suzuki et al. |
| 5,383,751 A | | 1/1995 | Wheetley et al. |
| 5,468,099 A | * | 11/1995 | Wheetley et al. ............. 408/1 R |
| 5,555,616 A | * | 9/1996 | Michalewski et al. ........ 29/34 B |
| 5,848,458 A | * | 12/1998 | Bullen ........................ 29/33 K |
| 5,920,974 A | * | 7/1999 | Bullen ........................ 29/33 K |
| 6,011,482 A | * | 1/2000 | Banks et al. ............. 29/407.05 |
| 6,036,409 A | | 3/2000 | Rissler |
| 6,073,326 A | * | 6/2000 | Banks et al. ................. 29/34 B |
| 6,088,897 A | * | 7/2000 | Banks et al. ................. 29/33 K |
| 6,098,260 A | * | 8/2000 | Sarh ........................... 29/33 K |
| 6,134,940 A | * | 10/2000 | Banks et al. ................. 29/34 B |

(Continued)

FOREIGN PATENT DOCUMENTS

DE  41 24 078  2/1992

(Continued)

*Primary Examiner*—Dana Ross
(74) *Attorney, Agent, or Firm*—Lerner, David, Littenberg, Krumholz & Mentlik, LLP

(57) ABSTRACT

A device for processing components, and in particular, sections for aircraft, includes a handling system that supports a holding frame. The holding frame includes at least one pressure stamp and/or at least one processing device or unit. By means of the handling system, the processing device is freely positionable in space in relation to the components. Preferably, in the region of the holding frame at least one connection element is arranged. Due to the connection elements, an essentially closed force ring is established between the holding frame and the components so that in an ideal case there is no longer any feedback of reaction forces to the handling system. The connection elements, the processing device and the pressure stamps can be movable by actuators and can comprise integrated force sensors and/or distance measuring sensors.

21 Claims, 7 Drawing Sheets

U.S. PATENT DOCUMENTS

| | | | |
|---|---|---|---|
| 6,163,946 A * | 12/2000 | Pryor | 29/407.04 |
| 6,172,374 B1 * | 1/2001 | Banks et al. | 29/243.5 |
| 6,210,084 B1 * | 4/2001 | Banks et al. | 29/34 B |
| 6,314,631 B1 * | 11/2001 | Pryor | 29/407.04 |
| 6,413,022 B1 * | 7/2002 | Sarh | 408/76 |
| 6,598,866 B2 * | 7/2003 | Helm et al. | 29/897.2 |
| 6,775,897 B2 | 8/2004 | Wolf et al. | |
| 6,877,203 B2 | 4/2005 | Engstrom et al. | |
| 2002/0092149 A1 * | 7/2002 | Wolf et al. | 29/464 |
| 2003/0116331 A1 * | 6/2003 | Boyl-Davis et al. | 173/1 |
| 2003/0207742 A1 * | 11/2003 | Hazlehurst et al. | 29/33 K |
| 2006/0179637 A1 * | 8/2006 | Schueler | 29/524.1 |
| 2007/0274797 A1 | 11/2007 | Panczuk et al. | |

FOREIGN PATENT DOCUMENTS

| | | |
|---|---|---|
| DE | 601 08 735 | 4/2000 |
| DE | 101 34 852 A1 | 8/2002 |
| EP | 442 803 A1 | 8/1991 |
| EP | 1 151 813 | 11/2001 |
| FR | 2 722 437 | 1/1996 |
| WO | WO-97/34733 A1 | 9/1997 |
| WO | WO-03/049899 | 6/2003 |
| WO | WO-2005/046931 | 5/2005 |

* cited by examiner

DEVICE FOR PROCESSING COMPONENTS FOR MEANS OF TRANSPORT, IN PARTICULAR FOR PROCESSING SECTIONS FOR AIRCRAFT

BACKGROUND OF THE INVENTION

The invention relates to a device for processing components for means of transport, in particular for processing sections for aircraft, comprising a handling system that supports a holding frame, wherein the holding frame comprises at least one pressure stamp and/or at least one processing device.

Known devices for processing components for example among other things comprise a handling system in the form of an industrial robot, with a hinged arm that can be positioned in several axes, wherein a tool, for example a drilling device, a riveting device or the like, is arranged on said hinged arm.

SUMMARY OF THE INVENTION

According to an exemplary embodiment of the invention, arranging at least one connection element in the region of the holding frame may make possible reliable positioning of the processing device, even on large-area components, by means of a handling system that supports the holding frame, wherein the handling system can comprise a mechanically relatively light construction, and in particular need not have any great inherent rigidity.

To be sure, with known devices for processing components adequate positioning speeds, and for the time being also satisfactory positioning accuracies, can be achieved. However, due to deformation in particular of flexible components and due to the deformation of the handling system itself, during the machining process positioning errors between the components and the processing device occur. Moreover, for components which lack inherent rigidity, as a matter of principle, interior systems to provide support are necessary, while such interior systems may be no longer required if a device according to an exemplary embodiment of the invention is used.

According to an exemplary embodiment of the invention, a device for machining components of extensive geometric dimensions is provided, which device allows spatially flexible positioning and at the same time precise positioning of various tools in relation to the component, wherein the handling system used for positioning is of a mechanically relatively light-weight design and construction.

According to an exemplary embodiment of the invention, at least one connection element is designed so as to be non-positively connectable to and disconnectable from a component surface so as to minimise the reaction forces which act on the handling system through the at least one processing device and/or through the at least one pressure stamp, by deflection to the component surface. In this way, reaction forces are largely kept away from the handling system.

A further exemplary embodiment of the invention provides for the holding frame, by means of the handling system, to be freely positionable in space in relation to the component surface. This design implementation may make it possible to bring the processing device near the component surface in a spatially flexible manner.

According to a further exemplary embodiment of the invention at least one pressure stamp comprises at least one actuator in order to make possible positioning relative to the holding frame. In this way it may be possible to position at least one pressure stamp largely independently of the movement of the holding frame in relation to the component surface with still better accuracies and/or defined force.

According to a further exemplary embodiment of the invention at least one connection element comprises at least one actuator in order to allow positioning relative to the holding frame. This embodiment may make possible, in addition to the movement options of the handling system, positioning of the connection elements that is at least partly independent thereof, which may provide good adaptability of the device to various surface geometries of components.

A further exemplary embodiment of the device provides for at least one processing device to comprise at least one actuator in order to make possible positioning relative to the holding frame. This may make possible very precise positioning of the processing device, which positioning is largely independent of the movement of the handling system.

According to a further exemplary embodiment of the device, at least one pressure stamp and/or at least one connection element comprises at least one force sensor and/or distance measuring sensor. With this embodiment gentle processing of sensitive components is possible because certain limiting forces, that are specifiable in advance, are not exceeded.

According to a further exemplary embodiment the connection element or the connection elements are preferably arranged distributed around the circumferential contour of the holding frame so as to be evenly spaced apart from each other. Due to the resulting symmetrical arrangement of the connection elements, this design embodiment may make it possible to introduce greater forces, resulting from the processing device and/or from the pressure stamps, to the component surface.

According to a further exemplary embodiment the holding frame is of a polygonal geometric shape, in particular with four longitudinal sides. This may make it easy to produce the holding frame.

According to a further exemplary embodiment at least two connection elements are slidably arranged on the longitudinal sides so as to make it possible to process the region of an end of the component. This may make possible more flexible avoidance of the device when processing components with complex component interference structures. Moreover, within the context of processing components by means of the device according to embodiments of the invention, for example longitudinal seams and transverse seams can be processed right up to the end of a component.

According to a further exemplary embodiment the holding frame comprises at least two pivoting holding arms, wherein the connection element or the connection elements are slidably arranged on the holding arms so as to make it possible to process the region of the ends of the components. This embodiment makes it possible to process the components up to their ends. Furthermore, this makes possible more flexible avoidance when processing components with component interference structures.

According to a further exemplary embodiment of the invention at least one processing device is arranged within at least one pressure stamp. By means of the pressure stamp for example at least two components that are tacked together in an overlapping region can be firmly pressed against each other for processing so that for example when a drill hole is made by means of the processing device no shavings can enter between the two components, and furthermore precise fit of the resulting drill hole may be achievable. This may further require the positioning of at least one connection element on each component.

A further exemplary embodiment of the invention provides for at least one connection element to comprise a suction device. This may make it possible, due to the ambient air pressure, to transfer relatively large mechanical forces by means of the connection elements from the holding frame to the component surface so that contact pressures emanating from the processing device and/or the pressure stamp are largely kept away from the handling system. Furthermore, this design embodiment may provide an advantage in that the connection elements can easily be detached from the component surface. Furthermore, there is no need for any connection aids on the component side, such as for example stud bolts, attachment drill holes or the like.

According to a further exemplary embodiment of the invention at least one processing device is arranged within at least one suction device.

This embodiment may make possible a spatially more compact design of the holding frame because at least one connection element concentrically encompasses the processing device, and the separate arrangement of at least one connection element on the holding frame can be omitted. As a result of this, components can be processed even in regions where access is difficult. Furthermore, due to its symmetry, this arrangement makes possible efficient and even transmission of any forces emanating from the processing device and/or from the pressure stamp. This arrangement quasi represents the ideal case of the principle of local force deflection according to an embodiment of the invention.

Further exemplary embodiments of the device are shown in the further claims.

DETAILED DESCRIPTION

Figure 1:
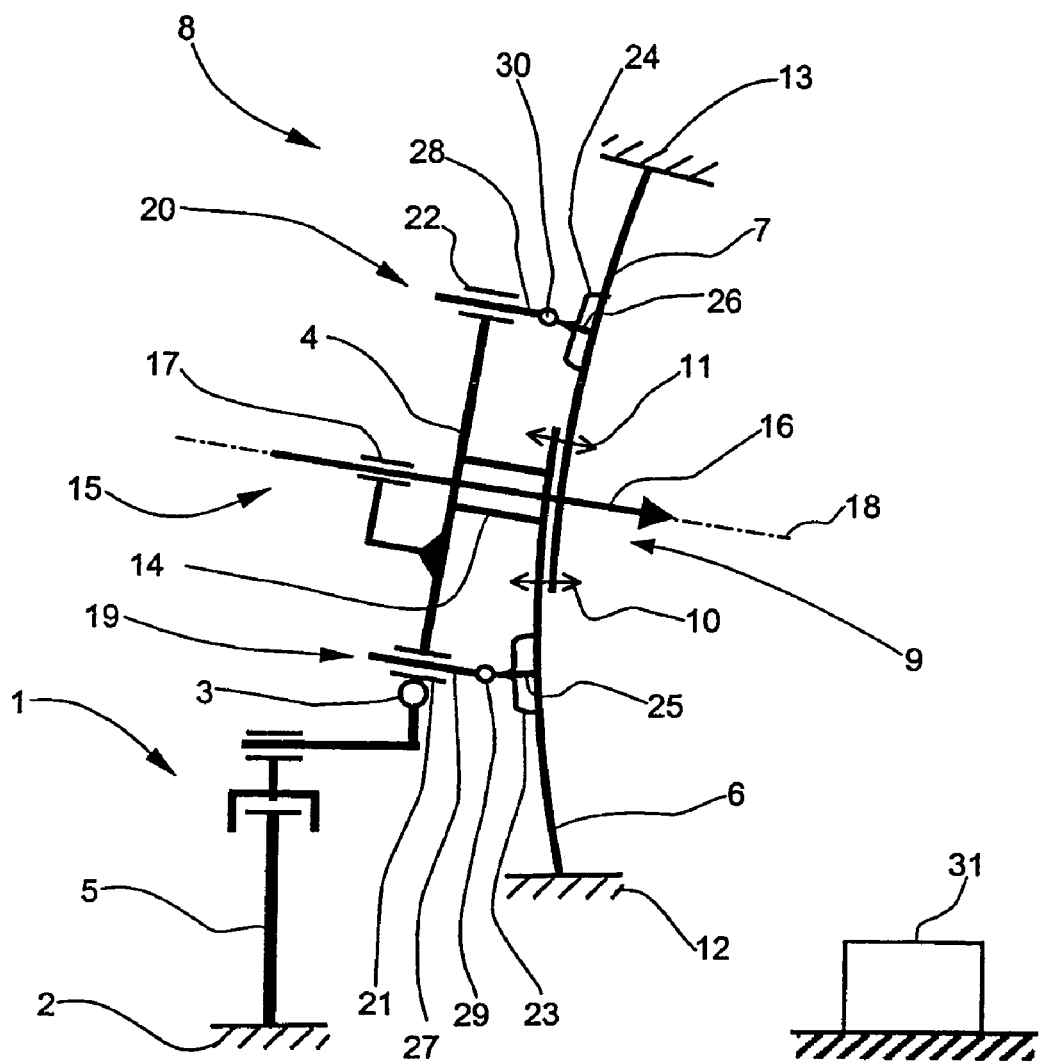
FIG. 1 a lateral view of a device according to an exemplary embodiment of the invention with a holding frame according to a first embodiment variant.

Identical or similar components in different figures have the same reference characters.

Devices for processing components for example among other things comprise a handling system in the form of an industrial robot, with a hinged arm that can be positioned in several axes, wherein a tool, for example a drilling device, a riveting device or the like, is arranged on said hinged arm. By means of the industrial robot, the drilling device can then be brought near that region of the component that is to be processed. For example, if a hole is to be drilled into the component to be processed, then the hinged arm of the industrial robot has to exert a sufficiently large mechanical force onto the drilling device to correspondingly maintain the contact relationships between the component and the tool as required by the machining process. However, this mechanical force is fed back, at least in part, to the industrial robot by way of the hinged or articulated arm. In particular in the case of large workpieces this results in a design requirement to construct the hinged arm or the entire mechanics of the industrial robot so that they are mechanically very rigid and robust so as to ensure the required positioning accuracy of the tool in relation to the component even in the case of very substantial forward feed forces and long lever arms. The rigid and robust mechanical design of the hinged arm and the entire handling system that is therefore required generally speaking involves an elaborate, cost-intensive and bulky design. Likewise, the component to be processed must also be provided with adequate rigidity during the machining process; a factor which in particular in the case of large-format components involves increased component-related expenditure as a result of the necessary stiffeners etc.

Thus, such a device for processing large-format components in cases where the same time good positioning accuracy of the tools is required are suitable only with handling systems which incorporate a massive design that, as a rule, requires the use of a corresponding internal system, or are suitable for spatially limited work spaces.

FIG. 1 shows a lateral view of a device according to an exemplary embodiment of the invention with a holding frame according to a first embodiment variant.

Among other things the device comprises a handling system 1, which is arranged so as to be fixed to an abutment 2. In an attachment point 3 the holding frame 4 is rigidly connected to a last axis of the handling system 1. In a different arrangement the holding frame 4 can be linked to the last axis of the handling system 1 by way of an additional joint. In this case the additional joint is designed so that it can be stiffened. The handling system 1 is for example designed as a known standard industrial robot or arm robot 5 comprising at least six axes, which robot makes possible almost any spatial positioning of the holding frame 4 in relation to a component surface 8 made up from components 6, 7.

The components 6, 7 are for example top shells, bottom shells or lateral shells as well as floor frames to form complete fuselage sections, with the skin not yet in place, for aircraft, in particular for passenger aircraft or military aircraft. However, the application of the device according to an embodiment of the invention is not limited to section construction for aircraft.

The components 6, 7 overlap in an overlapping region 9. In the overlapping region 9 the components are tacked by tacking elements 10, 11. Tacking ensures that the components 6, 7 in the overlapping region 9 do not shift in relation to each other or do not lift off from each other, and rest against each other so as to be essentially flat and parallel during processing. By a suitable arrangement of the tacking elements 10, 11 it becomes possible to process more than two-layer component packages. The tacking elements 10, 11 are for example designed in the form of a staple, a screw connection, a clamp connection or some comparable disconnectable or detachable connection. Temporary tacking, for example by way of a tacking rivet, is also possible. As an alternative, tacking of the components 6, 7 can also be effected by a non-disconnectable connection, at least in some regions, for example by means of tacking rivets, gluing, welding, pressing, clamping together or the like. In the embodiment shown the top tacking element 11 with the two components 6, 7 is not mandatory because the component 7 is adequately supported on the component 6.

When processing through-components 6, 7 which do not have an overlapping region 9, for example when placing drill holes in through plates, sheets or the like, no tacking elements 10, 11 are required because there is no overlapping region 9.

The components 6, 7 are supported on abutments 12, 13 so as to ensure the most accurate positioning possible in relation to the handling system 1. The abutments 12, 13 can for example be supporting frames, supporting bearings or the like. It is the function of the abutments 12, 13 to ensure that the relative position of the components 6, 7 vis-á-vis the handling system 1 is maintained during the machining process. Absolute positioning or referencing of the handling system 1 in relation to the components 6, 7 only needs to be effected with adequate accuracy, because determination of the relative position between the holding frame 4 and the components 6, 7 takes place in addition so that any positioning errors of the handling system 1 can be compensated for. Thus, irrespective of the great positioning accuracy required, the handling system 1 that is used within the device according to an embodiment of the invention needs to provide only sufficient mechanical strength to be able to absorb the forces resulting from the positioning process, which forces among other things result from the movement of the mass of the processing device 15 and of the holding frame 4.

Furthermore, the holding frame 4 comprises a pressure stamp 14 and a processing device 15. In the embodiment shown in FIG. 1 the processing device 15 is a drilling device 16 for drilling holes in the components 6, 7, which holes can for example be used to accommodate rivets. By means of an actuator 17 the processing device 15 is designed so as to be slidable on both sides in the direction of a longitudinal axis 18, and thus also in relation to the holding frame 4.

The device according to an embodiment of the invention can also be used for continuous or discontinuous joining processes. In these cases the processing device 15 comprises for example a riveting device; a welding device, and in particular a laser welding device or a friction stir welding device; a gluing device; a pressing device or the like.

Furthermore, the at least one processing device 15 can be designed so as to be exchangeable so that different processing devices 15 can quickly and easily be attached to the holding frame 4 to perform various production processes or machining processes.

The pressure stamp 14, which is rigidly connected to the holding frame 4, is in particular used to firmly press together the components 6, 7 in the overlapping region 9. This not only prevents machining chips or shavings from entering the space between the components 6, 7, but also results in a high degree of congruence between the partial holes that are made in the components 6 and 7. This is of importance in particular if for example rivets, screws or the like for connecting the components 6, 7 are to be inserted into the drill holes that are being made. Preferably, the pressure stamp 14 is designed such that it encompasses the processing device 15 at least in part. In a way that differs from that shown in FIG. 1, the holding frame 4 can comprise several pressure stamps 14 and/or processing devices 15.

According to an embodiment of the invention the holding frame 4 comprises the visible connection elements 19, 20. The connection elements 19, 20 can be positioned relative to the holding frame 4 by means of actuators 21, 22. Behind the connection elements 19, 20, offset to the rear and thus covered up in FIG. 1, two further connection elements, each with an actuator, are provided on the holding frame 4 in a way that corresponds to the connection elements 19, 20 (compare in particular FIG. 4). The connection elements 19, 20 are suction devices 23, 24. The suction devices 23, 24 are made from an elastic plastic material which ensures detachment from the component surface 8 without leaving any residue. The same also applies to the connection elements that are situated at the back and that are not visible. By means of evacuating the suction devices 23, 24, due to the ambient air pressure the holding frame 4 is non-positively connectable to the component surface 8, and when required can also easily be detached from said component surface 8. A fast and at the same time disconnectable connection between the holding frame 4 and the component surface 8 results. This requires an essentially smooth structure of the component surface 8. To ensure quick detachment of the suction devices 23, 24 from the component surface 8, devices (not shown) for blowing compressed air into the suction devices 23, 24 can be provided. As an alternative, the suction devices 23, 24 can also continue to adhere to the component surface 8 after the negative pressure has dissipated, so that the handling system 1 has to provide a certain detachment force. Instead of the suction devices 23, 24, the connection means 19, 20 can for example also comprise magnets; adhesive means, in particular artificial sticking lamella which are modelled on the sticking lamella of geckos; gluing means or the like.

In each instance at least one support element 25, 26, a so-called hard point, is integrated within the suction devices 23, 24. At their ends facing the component surface 8, the support elements 25, 26 comprise plastic elements (for the sake of clarity not shown in detail in FIG. 1) for forming a bearing surface. The same applies to the connection elements that are located at the back and that are not visible. In the evacuated state of the suction devices 23, 24, the plastic elements of the support elements 25, 26 rest as a bearing surface against the component surface 8. In this way undefined deformation of the suction devices 23, 24 due to the connection to the component surface 8 and/or due to evacuation, as well as undefined deformation of the suction devices 23, 24 as a result of any forces that may emanate from the holding frame 4, and any relative positioning error, resulting thereof, between the holding frame 4 and the component surface 8 may be avoided.

According to an exemplary embodiment of the invention any reaction forces generated by the processing device 15, for example reaction forces due to the forward feed of a processing device 15 formed as a drilling device 16, and/or the reaction forces due to the pressure stamp 14 pressing against the component surface 8 are directly transferred to the components 6, 7 and can therefore no longer feed back to the handling system 1. Due to the design, according to an exemplary embodiment of the invention, of the device, the handling system 1 can thus be designed to be mechanically less rigid and lighter in weight. Despite such a lighter and less rigid design of the handling system 1, the relative position between the processing device 15 and the components 6, 7 is better maintained, which results in an overall improvement of the process quality, for example the drilling quality. The shortened force paths according to an exemplary embodiment of the invention may furthermore significantly reduce the load on the components 6, 7.

By means of the device according to an exemplary embodiment of the invention it may be thus possible to process in particular large-format components 6, 7 with great precision. The surface geometry of the components 6, 7 can be in any desired shape and need not be flat.

The actuators 21, 22 comprise piston rods 27, 28 at whose ends the suction devices 23, 24 are swivellably linked by means of joints 29, 30. The joints 29, 30 make it possible to connect the suction devices 23, 24 even to component surfaces 8 that are not flat, in particular that are curved. The piston rods 27, 28 of the actuators 21, 22 are essentially designed so as to be movable perpendicularly relative to the holding frame 4. In an alternative embodiment the actuators 21, 22 can also be arranged so as to be movable relative to the holding frame 4, in particular so as to be slewable. The actuators 21, 22 can for example be hydraulic cylinders or compressed-air cylinders. As an alternative, electrically operable spindle drives, rack and pinion drives or other linear drives can be provided. Furthermore, the actuators 21, 22 can be designed such that they are mobile in more than one spatial direction or axis. The above explanations analogously apply also to the actuators and suction devices that are in the background in FIG. 1 and that are not shown.

Preferably the geometry of the horizontal projection of the holding frame 4 is square or rectangular, wherein in corner regions the connection elements, of which there are for example four, are arranged so as to achieve the most effective transfer possible, to the component surface 8, of the reaction forces that are caused by the processing device 15 and/or the pressure stamp 14 and that act on the holding frame 4. As an alternative, geometries of the horizontal projection which differ from the above, for example circular or elliptical geometries or combinations thereof, are also possible (compare in particular FIG. 4).

The holding frame 4 is, for instance, designed such that the suction devices 23, 24 are arranged as closely as possible to the processing device 15. Due to this arrangement in fact local "stiffening" of the components 6, 7 occurs in the effective region of the suction devices 23, 24, in particular if the thickness of the material of these components is slight. Such "stiffening" essentially results from the fact that the component surface 8, which can be deformed by the processing device, is reduced in size because the connection elements 19, 20 and/or the suction devices 23, 24 are positioned as closely as possible to the processing device 15. In this way even mechanically unstable components 6, 7, such as for example thin sheets of metal, which otherwise are susceptible to deformation as a result of the introduction of process-related pressing forces or tensile forces, can be processed using the device according to an exemplary embodiment of the invention without there being a danger of undesirable deformation.

Positioning and/or referencing of the holding frame 4 and of the pressure stamp 14 is by corresponding positioning of the handling system 1. The connection elements 19, 20 can be moved, independently hereof, relative to the holding frame 4 by means of the actuators 21, 22. The processing device 15 and/or the drilling device 16 itself is designed so as to be slidable in relation to the holding frame by means of the actuator 17, in the direction of the longitudinal axis 18, which extends so as to be essentially perpendicular in relation to the component surface 8.

If by means of the processing device 15, which is implemented as a drilling device, for example a hole is to be drilled into the components 6, 7, then first of all "referencing" of the holding frame 4 is carried out in relation to the components 6, 7. In this context the term "referencing" refers to determining the relative position between the components 6, 7 and the holding frame 4. Referencing can take place by detecting reference characteristics on the components 6, 7, for example in the form of drill holes, optical marks, component edges or the like.

Following this, the holding frame 4 is moved in such a way by means of the handling system 1 that the pressure stamp 14 ideally touches the component surface 8, or rests against said component surface 8 without exerting any force. As a result of positioning inaccuracies between the components 6, 7 and the pressure stamp 14, after completed positioning, the pressure stamp 14 either already presses against the component surface 8 with some slight force, or the pressure stamp 14 remains with little spacing immediately in front of the component surface 8 so that it does not touch said component surface 8. In either case position correction of the pressure stamp 14 can be carried out by means of a control and regulating device 31, which is also used for controlling the entire device, in particular the processing device 15, the actuators 17, 21, 22 and the suction devices 23, 24. The control and regulating device 31 is for example a computer unit, in particular a process control computer unit.

Following this, the connection elements 19, 20 and/or the suction devices 23, 24 are extended by means of the actuators 21, 22 and are placed onto the component surface 8. The actuators 21, 22 can for example be force-regulating pneumatic cylinders. Placement of the suction devices 23, 24 takes place using force that is adequate to ensure safe sealing of the suction devices 23, 24 during the evacuation process, while at the same time not causing any change in the relative position between the components 6, 7 and the pressure stamp 14.

The suction devices 23, 24 are then completely evacuated so that due to the ambient air pressure the holding frame 4 is non-positively connected to the components 6, 7 by way of the actuators 21, 22. In this arrangement the support elements 25, 26 or the plastic elements arranged at their ends rest firmly against the component surface 8. The support elements 25, 26 prevent a change in the position of the holding frame 4 in relation to the component surface 8 due to uncontrolled deformation of the suction devices 23, 24 as a result of evacuation or, or uncontrolled deformation of the suction devices 23, 24 by any forces emanating from the holding frame 4 and any possible resulting positioning errors resulting from this. In this process, due to the joints 29, 30, the suction devices 23, 24 can also be positioned in relation to the holding frame 4 at an angle that deviates from 90°. The device according to an exemplary embodiment of the invention can thus also be used for processing component surfaces 8 of almost any desired surface geometry, for example for processing convex, concave, flat or unevenly curved surfaces.

Furthermore, it is possible for the actuators 21, 22 to follow the suction devices 23, 24, which due to evacuation move in the direction of the components 6, 7; in other words the actuators 21, 22 can be extended in this direction.

Subsequently the actuators 21, 22 are retracted, in other words their direction of movement is reversed so that a bracing or tension force between the pressure stamp 14 and the components 6, 7 or the component surface 8 is built up. In this context, vibration-attenuating fixation of the resulting position of the actuators 21, 22 by means of suitable clamping elements that are also activated by the control and regulating device 31 is possible.

In this process, ideally no displacement between the components 6, 7 and the handling system 1 occurs. Any displacement that occurs in practical application is as a rule minimal and is thus negligible. Positioning of the holding frame 4 with the processing device 15 in relation to the components 6, 7 is performed by the handling system 1, while by way of the connection elements 19, 20 subsequently only passive fastening of the position of the holding frame 4 and the build-up of the bracing force between the pressure stamp 14 and the components 6, 7 takes place.

Finally, by means of the processing device 15, which is for example a drilling device 16, a hole or bore is drilled in the components 6, 7, or other processing steps are performed. Any reaction forces resulting from operating the processing device 15 and/or the pressure stamp 14, for example forward feed forces in the case of a drilling device, are absorbed by the holding frame 4 and are immediately fed back to the components 6, 7 by means of the connection elements 19, 20 so that a locally closed force ring is established. The resulting reaction forces are thus no longer transmitted back to the handling system 1 so that said handling system 1 can be constructed so as to be lighter and less rigid.

The above-described positioning sequence analogously also applies to the connection elements or suction devices and actuators that are positioned further back and are not shown in FIG. 1.

As an alternative it is also possible to position the pressure stamp 14 with the processing device 15 at first at predefined spacing just above the component surface 8, and after connection of the connection elements 19, 20 to the component surface 8 to move the pressure stamp 14 with the processing device 15 by retracting the actuators 21, 22—while at the same time tracking the position of the handling system 1—to the components 6, 7 for processing. In this case there would be no need to provide slidability of the processing device 15 along the longitudinal axis 18 by means of the actuator 17. However, the advantage of a simpler design and construction would have to be weighed against increased regulating effort and increased stability of the positioning achieved.

The actuators 21, 22, the pressure stamp 14, the processing device 15 and the handling system 1 can additionally comprise force sensors and/or distance measuring sensors, for example in the case where the processing device 15 is a drilling device 16, to measure the forces which act on a drill and/or milling cutter, and to vary forward feed accordingly.

Force sensing can for example take place in a tactile manner, i.e. by contact, or by way of measuring the current and/or the voltage in the region of power control electronics that are required to operate the actuators. Distance measuring can for example be performed electro-optically by means of laser technology, by means of a camera system, by incremental distance measuring or the like. Distance measuring and force sensing in the region of the connection elements and of the pressure stamp aims to ensure force distribution to all connection elements that is as even as possible.

Overall, the device according to an exemplary embodiment of the invention makes it possible to apply relatively great mechanical forces, that are spatially exactly defined, to the components 6, 7 or to the component surface 8, without said forces resulting in corresponding mechanical feedback to the handling system 1. Using the device according to an exemplary embodiment of the invention it is thus in particular possible to subject large-format components 6, 7 to very precise processing. In an exemplary embodiment of the device according to the invention the handling system 1 is for example designed as a standard industrial robot or arm robot 5 that is controllable in at least six axes.

Figure 2:
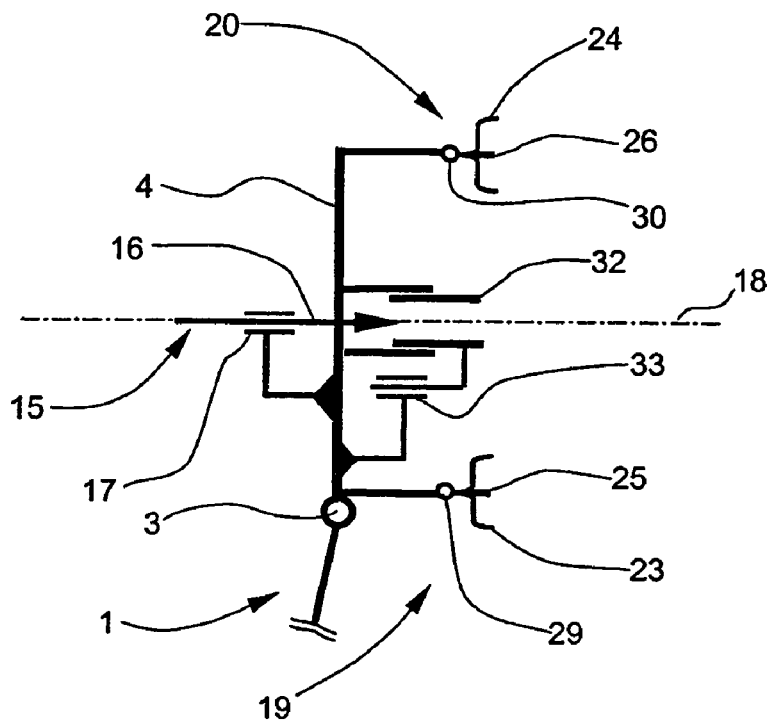
FIG. 2 a detailed view of a holding frame according to a second embodiment variant.

FIG. 2 is a detailed view of the holding frame according to a second embodiment variant.

The holding frame 4 is again connected to the handling system 1 at the attachment point 3. The holding frame 4 comprises the connection elements 19, 20, which by way of the joints 29, 30 are directly connected to the holding frame 4. The connection elements 19, 20 again are designed as suction devices 23, 24 with support elements 25, 26 arranged therein. Behind the connection elements 19, 20, offset towards the back in relation to the drawing plane and thus covered up in FIG. 2, two more connection elements 19, 20 with support elements are attached to the holding frame 4 by way of joints, corresponding to the arrangement of the connection elements 19, 20 (compare in particular FIG. 4). In a way that differs from that in the embodiment according to FIG. 1, the connection elements 19, 20 do not have any actuators and are connected to the holding frame 4 directly by way of the joints 29, 30.

The processing device 15 is again arranged in the region of the holding frame 4. The processing device 15, which in the example shown is a drilling device 16, is connected to the holding frame 4 by way of the actuator 17. The actuator 17 makes it possible to slide the processing device 15 parallel to the longitudinal axis 18 in both directions. The actuator 17 is permanently connected to the holding frame 4. Unlike the pressure stamp 14 in the embodiment according to FIG. 1, the pressure stamp 32 of the holding frame 4 is extendable and retractable in the direction of the longitudinal axis 18; in other words it can be pressed onto the components 6, 7 (not shown in detail in FIG. 2) and can be lifted off these components again. An additional actuator 33 is provided in order to be able to extend and retract the pressure stamp 32.

In order to process the components 6, 7 by means of the processing device 15, the holding frame 4 is first correspondingly positioned by means of the handling system 1, and then by means of the connection elements 19, 20 is placed onto the component surface 8 (not shown in detail) in a way that is similar to that discussed above in the context of the description of FIG. 1, and is fastened to said component surface 8 by means of evacuation of the suction devices 23, 24. Due to the lack of additional movement options of the connection elements 19, 20 in this embodiment, because there are no actuators 21, 22, this embodiment variant of the holding frame 4 does not provide any adaptability, or only limited adaptability, to various contours of the components 6, 7.

Thereafter by means of the actuator 33 the pressure stamp 32 can be extended, which pressure stamp 32 during this procedure presses the components 6, 7 together for processing by means of the processing device 15. At the same time by extending the pressure stamp 32 a bracing force is built up between the pressure stamp 32 and the components 6, 7 and/or the component surface 8. In this arrangement the support elements 25, 26 with the plastic elements are supported by the component surface 8 and thus prevent any displacement of the holding frame 4 in relation to the component surface 8 due to undefined deformation of the suction devices 23, 24 due to evacuation, as well as undefined deformation of the suction devices 23, 24 as a result of any forces emanating from the holding frame 4, which forces might lead to positioning errors.

In contrast to the embodiment of the holding frame 4 according to FIG. 1, in the present embodiment, because there are no actuators 21, 22, building up the bracing force between the holding frame 4 and the components 6, 7 only occurs by activating the telescopic pressure stamp 32. While this results in a simpler design of the holding frame 4 and in reduced weight, the connection elements 19, 20 are not so flexibly adaptable to different surface geometries of the components 6, 7.

The processing device 15, which is a drilling device, can again be moved by means of the actuator 17 in the direction of the component surface 8 to drill the desired holes. In this arrangement the actuator 17 makes possible very precise variation of the feed forces and feed paths acting on the drilling device 16.

The actuator 17 and the actuator 33 for moving the pressure stamp 32 can comprise force sensors and/or distance measuring sensors (not shown in detail) to register the forces experienced and distances travelled, and for example to correspondingly regulate the control of the feed speed of a processing device 15 which is a drilling device 16.

Figure 3:
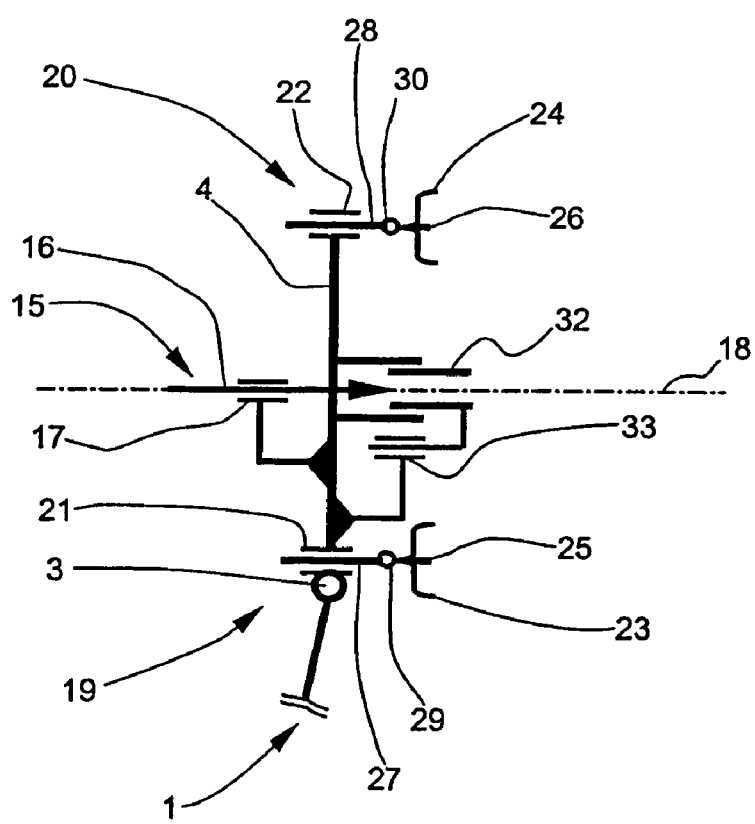
FIG. 3 a detailed view of a holding frame according to a third embodiment variant.

FIG. 3 is a detailed view of the holding frame according to a third embodiment variant.

At the attachment point 3 the holding frame 4 is connected to the handling system 1. In a way that differs from that in the embodiment variant according to FIG. 2 this embodiment variant comprises connection elements 19, 20 which can again be positioned by means of the actuators 21, 22, in relation to the holding frame 4, corresponding to the embodiment shown in FIG. 1. The connection elements 19, 20 are suction devices 23, 24. By means of the joints 29, 30 said suction devices 23, 24 are linked, so as to be articulated, to the piston rods 27, 28. Corresponding to the first embodiment variant, the support elements 25, 26 are arranged in the suction devices 23, 24, wherein each end of the support elements comprises a plastic element to provide a bearing surface. Behind the connection elements 19, 20, offset to the rear in relation to the drawing plane, and thus covered up in FIG. 3, an additional two connection elements with support elements are attached to the holding frame 4 by way of joints, corresponding to the arrangement of the connection elements 19, 20 (compare in particular FIG. 4).

The processing device 15 and/or the drilling device 16 can also be positioned in the direction of the longitudinal axis 18, corresponding to the first embodiment variant, by means of the actuator 17. Furthermore, in this embodiment variant the pressure stamp 32 can additionally be positioned by means of the actuator 33 in the direction of the longitudinal axis 18.

As a result of the ability to position the pressure stamp 32 and the connection elements 19, 20 at the same time by means of the actuators 17, 21, 22 and 33, when compared to the first and second embodiment variant according to FIGS. 1 and 2 enhanced movement options are provided by combining the movement options, which exist independently of each other, of the connection elements 19, 20, of the pressure stamps 14, 32 as well as of the processing device 15. As far as the further description is concerned, reference is made to the information already provided in the context of the description of FIGS. 1 and 2.

Figure 4:
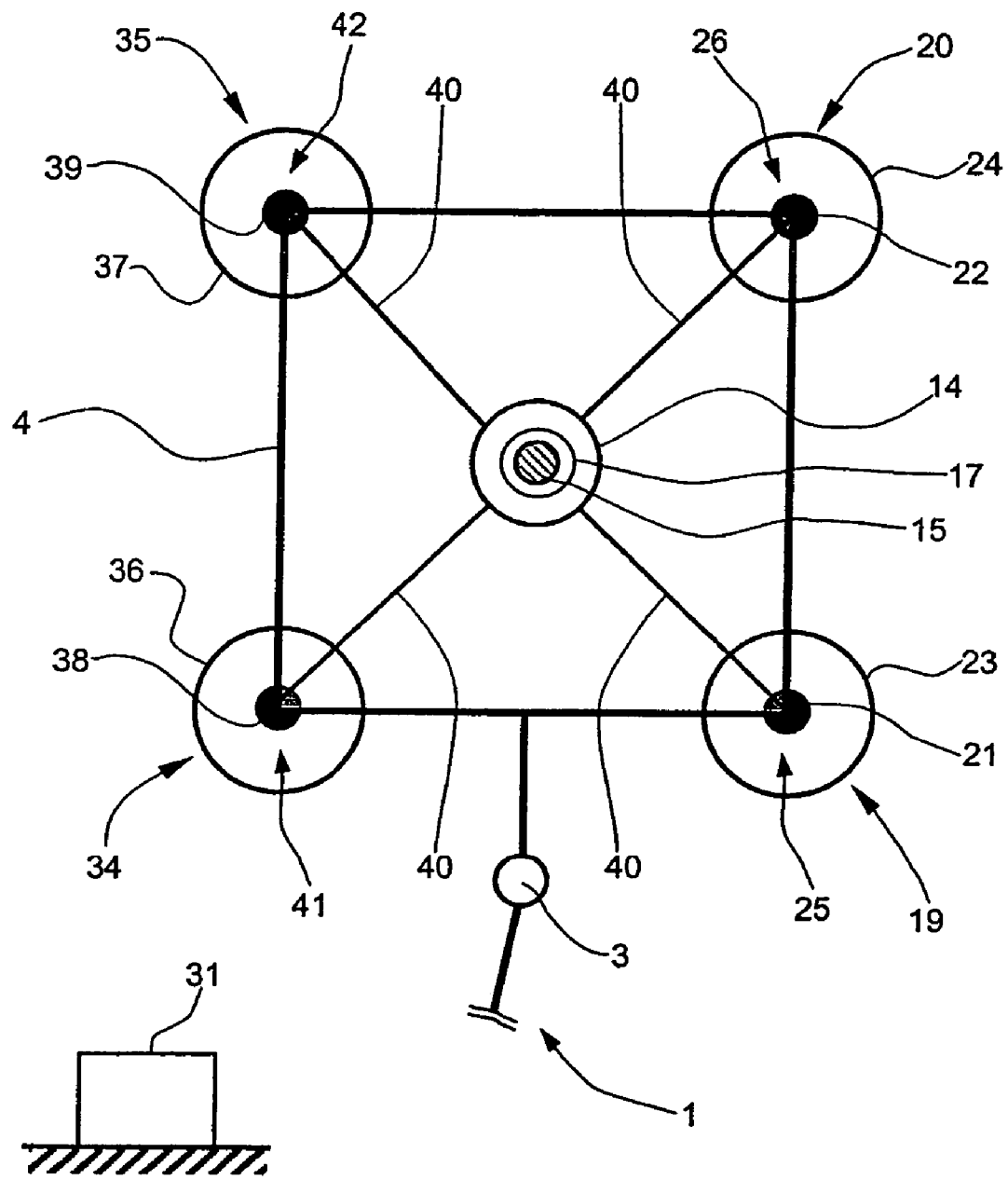
FIG. 4 a top view of the holding frame according to the first embodiment variant.

FIG. 4 shows a top view of the holding frame according to the first embodiment variant.

At the attachment point 3 the holding frame 4 is permanently connected to the handling system 1. On the holding frame 4, connection elements 19, 20 as well as the connection elements 34, 35, which are situated in the rear and are not visible in FIGS. 1 to 3, are arranged in corner regions of the holding frame 4. The four connection elements 19, 20 as well as 34, 35 are again designed as suction devices 23, 24 and 36, 37. The four suction devices 23, 24, 36, 37 comprise support elements 25, 26 and 41, 42 corresponding to the previously described embodiment forms. The four connection elements 19, 20, 34, 35 are connected to the holding frame 4 by way of actuators 21, 22, 38, 39 and can be moved essentially perpendicularly to the drawing plane.

The pressure stamp 14 may be arranged approximately in the centre within the holding frame 4 by way of the webs 40. The processing device 15 is positioned approximately concentrically within the pressure stamp 14. By means of the actuator 17 the processing device 15 can be positioned perpendicularly to the drawing plane. Arrangements of the pressure stamp 14 and the processing device 15 on the holding frame 4, which arrangements differ from the positions shown, are also possible.

In a way that is different from the circular cross section of the pressure stamp 14 shown, an alternative design is possible, where the processing device 15 is only partly encompassed. In this case the cross sectional geometry of the pressure stamp 14 can for example be U-shaped. Furthermore, the holding frame 4 can also be of a geometric shape that differs from that shown in FIG. 4. The holding frame 4 can for example be rectangular, circular, elliptical in shape or any combination thereof.

All the actuators 17, 21, 22, 38, 39 that are provided for operating the device according to an exemplary embodiment of the invention can for example be hydraulic cylinders or compressed-air cylinders. As an alternative or in combination, electrically or hydraulically operable spindle drives, rack and pinion drives or the like can be provided. Furthermore, the actuators 17, 21, 22, 38, 39 can be designed such that they are movable in more than one spatial direction or axis, wherein each actuator 17, 21, 22, 38, 39 may comprise at least one force sensor and/or distance measuring sensor to register the spatial position.

By means of the control and regulating device 31 the actuators 17, 21, 22, 38, 39, the suction devices 23, 24, 36, 37, the pressure stamps 14, 32 and the handling system 1 are controlled, taking into account the readings obtained from any force sensors and/or distance measuring sensors coupled to the actuators 17, 21, 22, 38, 39. Furthermore, the control and regulating device 31 is also used to control the negative pressure in the suction devices 23, 24, 36, 37.

The device can also comprise only at least two connection elements 19, 20. However, using at least three connection elements 19, 20, 34 results in better seating of the holding frame 4 on the component surface 8 so that the holding frame 4 in particular can no longer tilt along a symmetry axis and so that overall a more stable machining process results.

Figure 5:
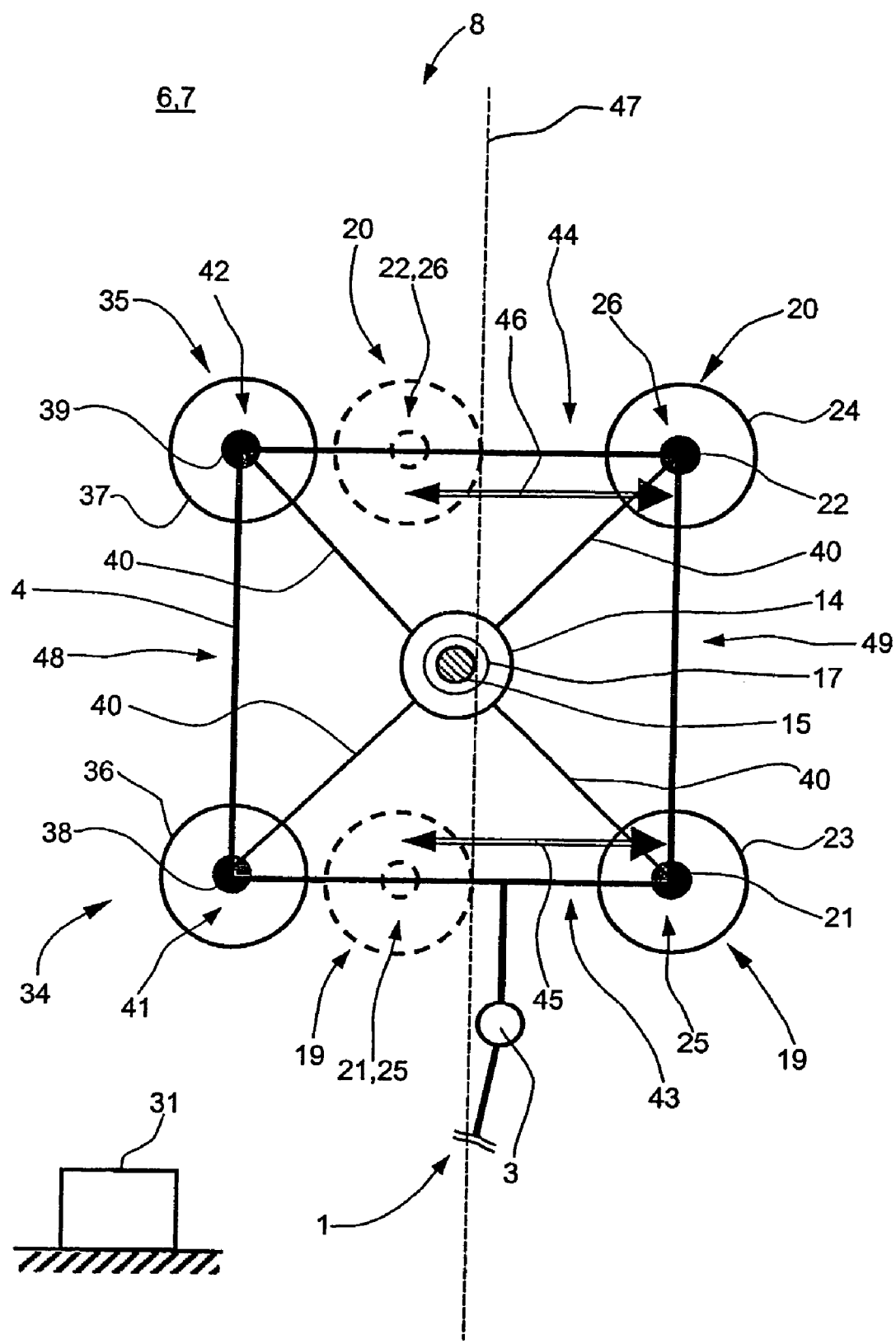
FIG. 5 a top view of a further embodiment variant of the holding frame.

FIG. 5 shows a top view of a further embodiment variant of the holding frame 4.

In the four corner regions of the holding frame 4 again the connection elements 19, 20, 34, 35, which are formed as suction devices 23, 24, 36, 37, are arranged. The connection elements 19, 20, 34, 35 can be moved essentially perpendicularly to the drawing plane by means of the actuators 21, 22, 38, 39. By means of the webs 40, the pressure stamp 14, the processing device 15 and the actuator 17 are connected to the holding frame 4. In this arrangement the processing device 15 is in close proximity to a component end 47. The connection elements 19, 20, 34, 35 comprise support elements 25, 26, 41, 42 corresponding to the embodiment according to FIG. 4. At the attachment point 3 the holding frame 4 is connected to the handling system 1 in the known way.

In a way that differs from that in the embodiment variant according to FIG. 4, the connection elements 19, 20 in the form of suction devices 23, 24 including the actuators 21, 22 are arranged along longitudinal sides 43, 44 of the holding frame 4 in the direction of the arrows 45, 46 by means of actuators (not shown in detail) so as to be slidable on the holding frame 4. The connection elements 19, 20 shown in a dashed line indicate an exemplary movement position of the connection elements 19, 20 including the actuators 21, 22 and the support elements 25, 26. In this arrangement the connection elements 19, 20 are displaced to such an extent that they still rest completely on the component surface 8 so as to ensure safe connection of the holding frame 4 to said component surface 8. This embodiment makes it possible to safely connect the holding frame 4 by means of the connection elements 19, 20, 34, 35 even in cases where processing of the components 6, 7 is to take place in close proximity of the component end 47. Furthermore, the slidability of the connection elements makes possible more flexible avoidance should interfering structures of the components be in the movement path of the device according to an exemplary embodiment of the invention. In a further embodiment variant (not shown) it is for example possible to design all the connection elements 19, 20, 34, 35 along the longitudinal sides 43, 44 and along longitudinal sides 48, 49 of the holding frame 4 so that they are individually slidable. By means of the control and regulating device 31 the movement processes and the positions of all actuators are controlled and coordinated.

Figure 6:
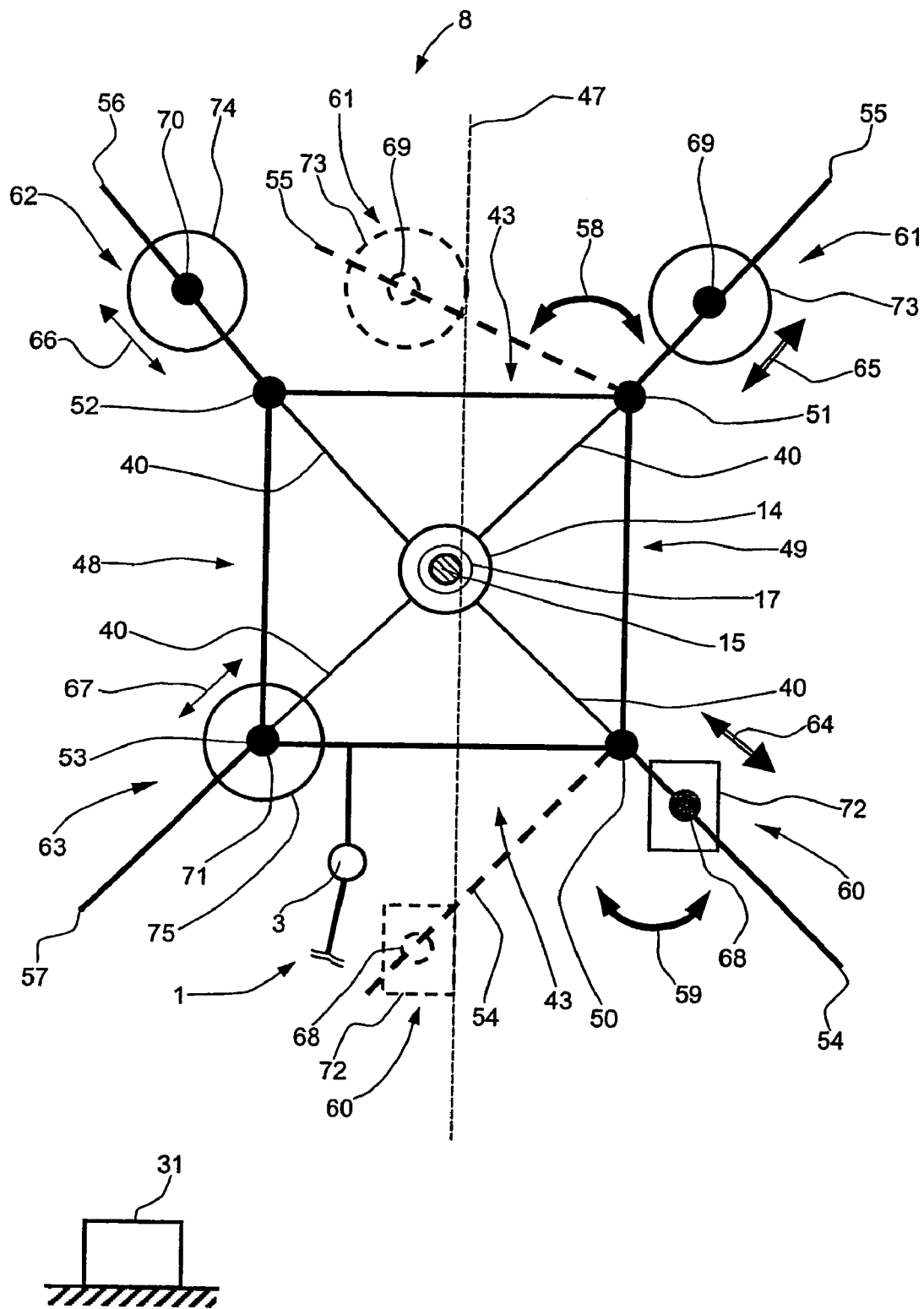
FIG. 6 a top view of a further embodiment variant of the holding frame.

FIG. 6 shows a top view of a further embodiment variant of the holding frame 4.

The pressure stamp 14, the processing device 15 and the actuator 17 are also connected to the holding frame 4 by way of the webs 40 as set out in the embodiment variant described above. The processing device 15 is situated in the region of the component end 47. At the attachment point 3, the holding frame 4 is connected in the known way to a handling system 1 (not shown). The holding frame 4 with its longitudinal sides 43, 44, 48, 49 forms an essentially square arrangement. However, in an arrangement that differs from this, rectangular, polygonal or other geometric arrangements are also possible. In each of the four corner points 50, 51, 52, 53 of the holding frame 4 a holding arm 54, 55, 56, 57 is arranged. As indicated by the arrows 58, 59, the holding arms 54 and 55 are pivotable arranged by means of actuators (not shown). In an alternative embodiment variant the holding arms 56 and 57 can also be designed so as to be pivotable on the corner points 52, 53.

The holding arms 54 to 57 comprise connection elements 60, 61, 62, 63, slidably arranged on the holding arms 54 to 57 in the direction of the arrows 64, 65, 66, 67 by means of actuators (not shown). The connection elements 60 to 63 comprise the actuators 68, 69, 70, 71. By means of the actuators 68 to 71 the connection elements 60 to 63 are slidable essentially perpendicularly in relation to the drawing plane. The connection elements 60 to 63 are suction devices 72, 73, 74, 75, each comprising a support element (for the sake of clarity not shown). Analogously to the previously described embodiment variants of the holding frame 4 (compare in particular FIGS. 4 and 5), the support elements are above all used to support the connection elements 60 to 63 on the component surface 8. The connection elements 60, 61 shown in dashed lines indicate an exemplary position, taken up by slewing the holding arms 54, 55, of the connection elements 60, 61 in the region of the component end 47. In this arrangement the holding arms 54 are slewed sufficiently far for the connection elements 60, 61 to just rest completely on the component surface 8 so as to ensure still safe connection of the holding frame 4. In this position the components 6, 7 can be processed with the processing device 15 also in the region of the component end 47, because safe connection of the holding frame 4 by means of the slewed connection elements 60, 61 and the connection elements 62, 63 is still possible. Furthermore, the ability to slew the connection elements makes possible more flexible avoidance if component interference structures are encountered.

In a way that differs from the above-described embodiments of suction devices, the suction device 72 of the connection element 60 is here rectangular in shape. In the slewing position of the connection element 60, shown by a dashed line, the rectangular shape of the suction device 72 makes possible even nearer positioning of the suction device 72 in relation to the component end 47 and thus processing of the components 6, 7 with the processing device 15 in close proximity to the component end 47. When compared to the circular suction devices 73, 74, 75, the rectangular suction device 72 makes it possible to further minimise the distance to the component end 47. If necessary, the remaining suction devices 73 to 75 can also be rectangular, square or in any geometric shape, other than circular shape, that is suitable for minimising said distance. By means of the control and regulating device 31 the movements and positions of all actuators are again controlled and coordinated.

Figure 7:
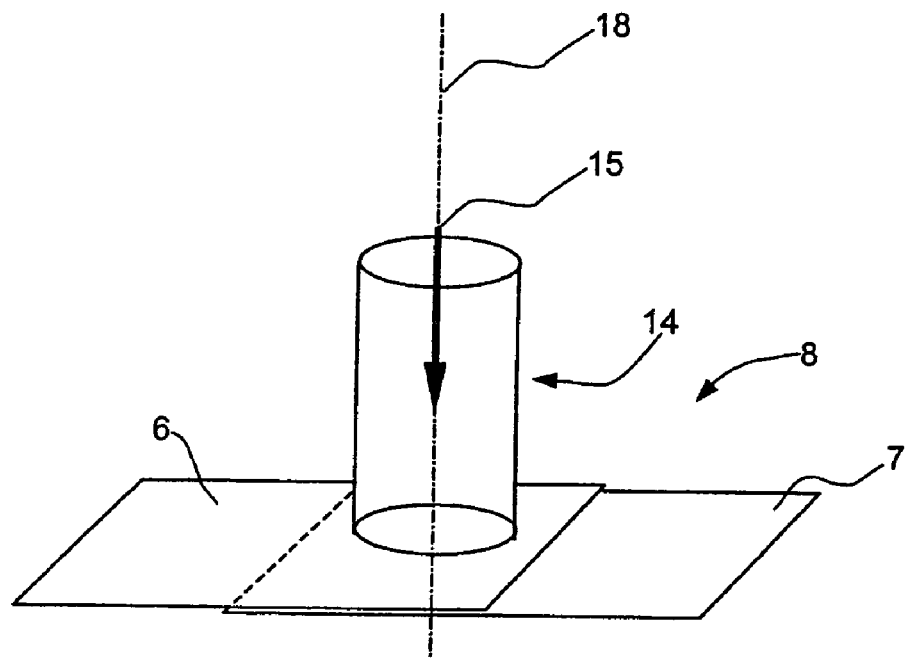
FIG. 7 a perspective view of a pressure stamp.

FIG. 7 shows a perspective view of a pressure stamp.

The pressure stamp 14 pushes the components 6, 7 down for processing. For the sake of clarity any tacking means used are not shown. The pressure stamp 14 is essentially hollow cylindrical in shape and partly encompasses the processing device 15 and/or the drilling device 16 along its longitudinal axis.

Figure 8:
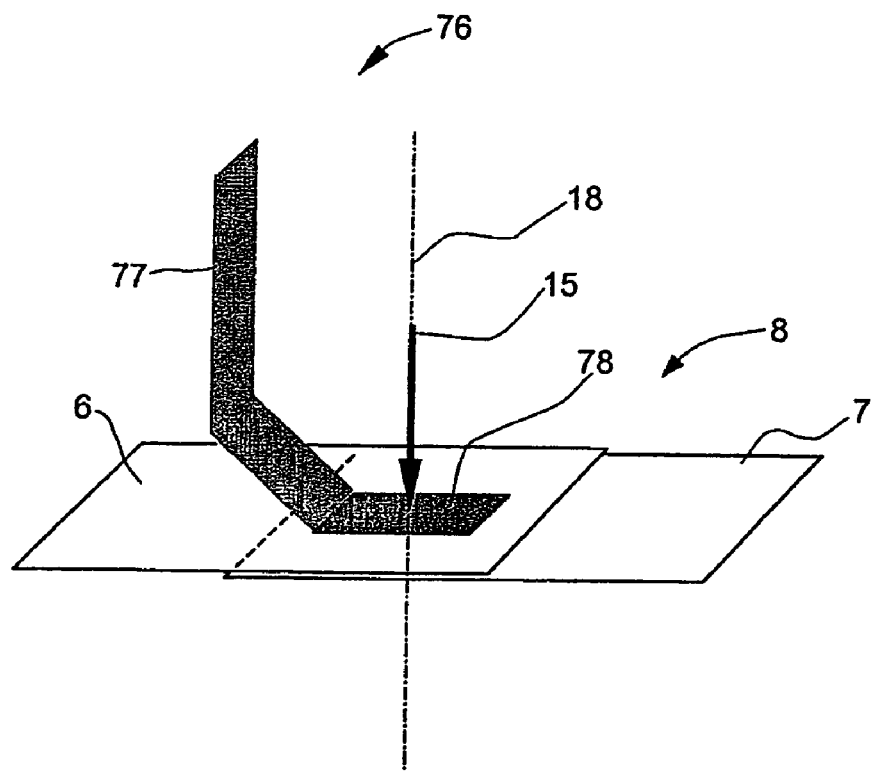
FIG. 8 a perspective view of a further embodiment variant of the pressure stamp.

FIG. 8 shows an embodiment variant of a pressure stamp.

A pressure stamp 76 is essentially L-shaped. The pressure stamp 76 among other things comprises a fixing device 77. A contact pressure surface 78 is arranged so as to be approximately perpendicular in relation to the fixing device 77 at its lower end. The contact pressure surface 78 extends approximately parallel to the component surface 8 or to the components 6, 7. By means of the contact pressure surface 78 the pressure stamp 76 presses the components 6, 7 together for processing. For the sake of clarity any tacking means used are not shown. So that the processing device 15 can reach the component surface 8 along the longitudinal axis 18, or can penetrate the contact surface 78, said contact surface 78 comprises corresponding recesses (not shown in detail in FIG. 6) to move the processing device 15 through. The pressure stamp 76, too, is controllable by means of the control and regulating device (compare FIGS. 1 and 4). Further embodiments of pressure stamps 14, 32, 76 are possible.

Figure 9:
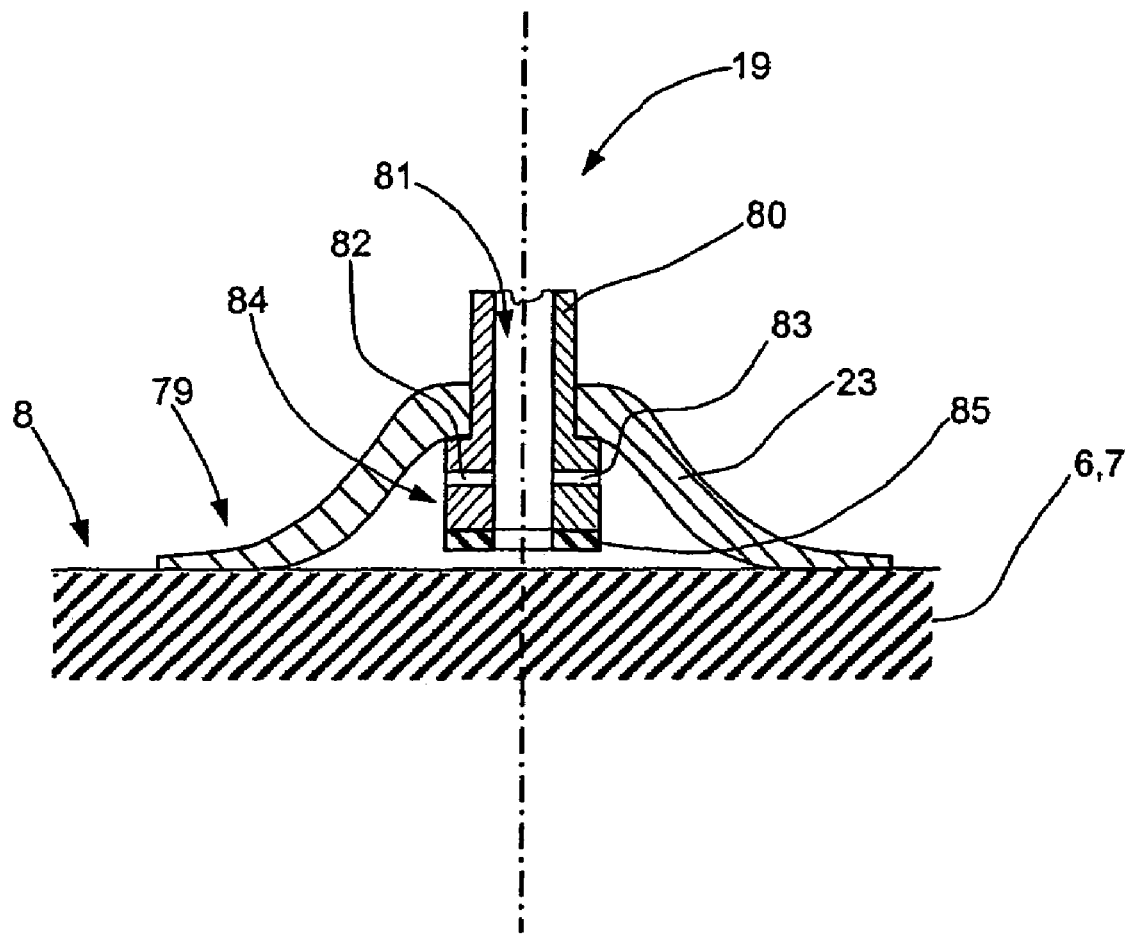
FIG. 9 a cross section of a suction device.

Using the example of the connection element 19, FIG. 9 shows a cross section of a circular suction device. The following information applies analogously to suction devices of rectangular or any other geometric shape.

The connection element 19 comprises the suction device 23. The suction device 23 comprises an elastic plastic material which ensures detachment from the component surface 8 without leaving any residue. The geometric shape of the suction device 23 is essentially that of a pot. The suction device rests on the component surface 8 and/or on one of the components 6, 7 by way of a circular margin area. In the upper region of the suction device 23 an attachment element 80 is permanently connected to said suction device 23. The attachment element 80 is used for connecting the suction device 23 to further elements (not shown in detail), for example actuators or the like. The attachment element 80 also comprises a drill hole 81. By means of the drill hole 81, within the suction device 23 negative pressure can be established or compressed air can be injected into said suction device 23 by way of additional air drill holes 82, 83. Injecting compressed air into the suction device 23 makes it possible to lift said suction device from the component surface 8 very quickly and above all without any use of force.

At its lower end, which faces the component surface 8, the attachment element 80 is designed as a support element 84 and/or functions as a "support foot" or a so-called "hard point". To protect the surface of the component 8, and to provide the required anti-slip property at the lower end, the support element 84 comprises a bearing element 85 made from a suitable material, in particular a plastic material, which ensures detachment from the component surface 8 without leaving any residue. Depending on the rigidity of the plastic material used for forming the bearing element 85, pressing the suction device 23 prior to evacuation results in forces of various strengths acting on the component surface 8 and on the handling system 1. If these forces are sufficiently modest, the suction device 23 can also be operated until the bearing element 85, and/or the hard point formed by the support element 84 and the bearing surface 85, rest against the component surface 8.

The support element 84 in conjunction with the bearing element 85 in the evacuated state of the suction device 23 prevents undefined deformation of said suction device 23 because the vertical deformation path of the suction device 23 is limited perpendicularly to the component surface by the support element 84 and/or the bearing element 85. Apart from this, deformation of the suction device 23 as a result of forces emanating from the holding frame 4 is avoided because said forces are directly deflected to the component surface 8 by the support element 84 in conjunction with the bearing element 85. In this way any displacement of the suction device 23, which suction device 23 is at least in part made from a flexible plastic material, in relation to the component surface 8, which displacement may under certain circumstances result in positioning errors between the attachment means 80 and the component surface 8, is reduced.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

LIST OF REFERENCE NUMERALS

1 Handling system
2 Abutment
3 Attachment point
4 Holding frame
5 Arm robot
6 Component
7 Component
8 Component surface
9 Overlapping region
10 Tacking element
11 Tacking element
12 Abutment
13 Abutment
14 Pressure stamp
15 Processing device
16 Drilling device
17 Actuator
18 Longitudinal axis
19 Connection element
20 Connection element
21 Actuator
22 Actuator
23 Suction device
24 Suction device
25 Support element
26 Support element
27 Piston rod
28 Piston rod
29 Joint
30 Joint
31 Control and/or regulating device
32 Pressure stamp
33 Actuator
34 Connection element
35 Connection element
36 Suction device
37 Suction device
38 Actuator
39 Actuator
40 Web
41 Support element
42 Support element
43 Longitudinal side
44 Longitudinal side
45 Arrow
46 Arrow
47 Component end
48 Longitudinal side
49 Longitudinal side
50 Corner point
51 Corner point
52 Corner point
53 Corner point
54 Holding arm
55 Holding arm
56 Holding arm
57 Holding arm
58 Arrow
59 Arrow
60 Connection element
61 Connection element
62 Connection element
63 Connection element
64 Arrow
65 Arrow
66 Arrow
67 Arrow
68 Actuator
69 Actuator
70 Actuator
71 Actuator
72 Suction device
73 Suction device
74 Suction device
75 Suction device
76 Pressure stamp
77 Fixing device
78 Contact pressure surface
79 Margin area
80 Attachment element
81 Drill hole
82 Air drill hole
83 Air drill hole
84 Support element
85 Bearing element Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claim is:

1. A device for processing sections for aircraft, comprising:
a handling system, and
a holding frame,
wherein the handling system supports the holding frame,
wherein the holding frame comprises at least one pressure stamp and/or at least one processing unit,
wherein in the region of the holding frame at least one connection element is arranged and
wherein the holding frame is freely positionable in space in relation to the component surface, no connection aids on the component side are needed for processing, and the device is enabled to process the components exclusively from one component side.

2. The device of claim 1, wherein at least one connection element is designed so as to be non-positively connectable to and detachable from a component surface so as to minimise reaction forces which act on the handling system by the at least one processing unit and/or by the at least one pressure stamp, by deflection to the component surface.

3. The device of claim 1, wherein at least one pressure stamp comprises at least one actuator in order to make possible positioning relative to the holding frame.

4. The device of claim 1, wherein at least one connection element comprises at least one actuator in order to allow positioning relative to the holding frame.

5. The device of claim 1, wherein at least one processing unit comprises at least one actuator in order to make possible positioning relative to the holding frame.

6. The device of claim 1, wherein at least one pressure stamp and/or at least one connection element comprises at least one force sensor and/or distance measuring sensor.

7. The device of claim 1, wherein the connection element or the connection elements are arranged around a circumferential contour of the holding frame so as to be essentially evenly spaced apart from each other.

8. The device of claim 1, wherein the holding frame comprises a polygonal geometric shape.

9. The device of claim 8, wherein at least two connection elements are slidably arranged on the longitudinal sides so as to make it possible to process the components in a region of an end of a component.

10. The device of claim 1, wherein the holding frame comprises at least two slewable holding arms, wherein the connection element or the connection elements are slidably arranged on the holding arms so as to make it possible to process the components in a region of an end of a component.

11. The device of claim 1, wherein at least one pressure stamp is arranged within the holding frame.

12. The device of claim 1, wherein at least one processing unit is arranged within at least one pressure stamp.

13. The device of claim 1, wherein at least one connection element comprises a suction device.

14. The device of claim 1, wherein at least one processing unit is arranged within at least one suction device.

15. The device of claim 1, wherein at least one processing unit comprises at least one element for processing the components by way of material-cutting.

16. The device of claim 1, wherein at least one processing unit comprises at least one element for joining the components.

17. The device of claim 1, wherein at least one processing unit comprises at least one element for surface processing the components.

18. The device of claim 3, comprising a control and/or regulating system.

19. The device of claim 1, wherein the handling system comprises at least one standard industrial robot.

20. A device for processing sections for aircraft, comprising:
   a handling system, and
   a holding frame,
   wherein the handling system supports the holding frame,
   wherein the holding frame comprises at least one pressure stamp and/or at least one processing unit,
   wherein in the region of the holding frame at least one connection element is arranged wherein the holding frame comprises a polygonal geometric shape,
   wherein at least two connection elements are slidably arranged on the longitudinal sides so as to make it possible to process the components in a region of an end of a component.

21. A device for processing sections for aircraft, comprising:
   a handling system, and
   a holding frame,
   wherein the handling system supports the holding frame,
   wherein the holding frame comprises at least one pressure stamp and/or at least one processing unit,
   wherein in the region of the holding frame at least one connection element is arranged,
   wherein the holding frame comprises at least two slewable holding arms, wherein the connection element or the connection elements are slidably arranged on the holding arms so as to make it possible to process the components in a region of an end of a component.

* * * * *